(12) United States Patent
Niederoest et al.

(10) Patent No.: US 6,740,687 B2
(45) Date of Patent: *May 25, 2004

(54) LATEX REPLACEMENT POLYURETHANE FOAMS WITH IMPROVED FLAME RETARDANCY

(75) Inventors: Beat Niederoest, Marlton, NJ (US); Andrew M. Thompson, West Chester, PA (US); Joseph W. Lovette, Newark, DE (US); Chiu Y. Chan, Wilmington, DE (US)

(73) Assignee: Foamex L.P., Linwood, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/219,043

(22) Filed: Aug. 14, 2002

(65) Prior Publication Data

US 2004/0034114 A1 Feb. 19, 2004

(51) Int. Cl.[7] .............................................. C08G 18/28
(52) U.S. Cl. .................. 521/130; 521/137; 521/174
(58) Field of Search ................... 521/130, 137, 521/174

(56) References Cited

U.S. PATENT DOCUMENTS

| | | |
|---|---|---|
| 4,285,893 A | 8/1981 | Contastin |
| 4,777,186 A | 10/1988 | Stang et al. |
| 4,783,291 A | 11/1988 | Pagan |
| 4,883,825 A | 11/1989 | Westfall et al. |
| 5,128,381 A | 7/1992 | Tane et al. |
| 5,130,346 A | 7/1992 | Ishii et al. |
| 5,194,453 A | 3/1993 | Jourquin et al. |
| 5,369,138 A | 11/1994 | Gansen |
| 5,476,619 A | 12/1995 | Nakamura et al. |
| 5,500,452 A | 3/1996 | Baker, Jr. et al. |
| 5,521,226 A | 5/1996 | Bleys |
| 5,605,939 A | 2/1997 | Hager |
| 5,648,559 A | 7/1997 | Hager |
| 5,650,452 A | 7/1997 | Thompson et al. |
| 5,668,378 A | 9/1997 | Treboux et al. |
| 5,674,920 A | 10/1997 | Obata et al. |
| 5,698,609 A | 12/1997 | Lockwood et al. |
| 5,708,045 A | 1/1998 | Thompson et al. |
| 5,718,856 A | 2/1998 | Kinkelaar et al. |
| 5,804,113 A | 9/1998 | Blackwell et al. |
| 5,968,993 A | 10/1999 | Bleys |
| 6,051,622 A | 4/2000 | Kinkelaar et al. |
| 6,063,309 A | 5/2000 | Hager et al. |
| 6,372,812 B1 | 4/2002 | Niederoest |

FOREIGN PATENT DOCUMENTS

WO  WO 93 099 34  5/1993

*Primary Examiner*—John M. Cooney, Jr.
(74) *Attorney, Agent, or Firm*—Connelly Bove Lodge & Hutz LLP

(57) ABSTRACT

Polyurethane foams formed under vacuum (below atmospheric pressure) conditions using toluene diisocyanate or a specific mixture of polyisocyanates with a specific mixture of polyether and graft polyols produces a foam with lower density and better flame retardancy than latex foam, but with equally high resiliency. The foam-forming ingredients are mixed together and foamed under controlled pressures in the range 0.6 to 0.95 bar (absolute), preferably 0.8 to 0.95 bar (absolute). The resulting foam has a ball rebound above about 65 percent.

17 Claims, 1 Drawing Sheet

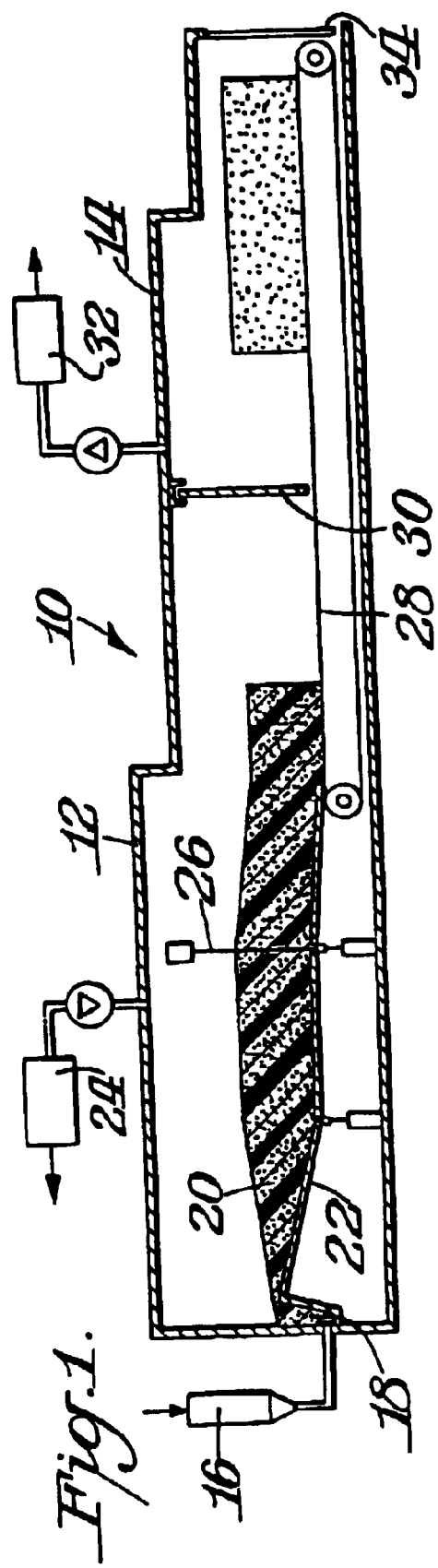

LATEX REPLACEMENT POLYURETHANE FOAMS WITH IMPROVED FLAME RETARDANCY

This invention relates to flexible polyurethane foams used in bedding and furniture cushions, and as components of bedding mattresses and mattress pads. Produced under vacuum conditions from certain foaming mixtures, the foams of this invention provide a low density foam with high resiliency and improved flame retardancy. Such polyurethane foams are offered as replacements for latex foams in bedding and furniture applications.

BACKGROUND OF THE INVENTION

Latex has been used commercially for bedding mattress applications, primarily because latex foams generally have superior resiliency. One typical measurement for resiliency is ball rebound (ASTM D 3574), where a steel ball is dropped from a fixed height onto a foam sample and then is allowed to bounce back from the sample surface. The height on the first rebound is compared to the original height, and the percent of height in rebound is reported. A higher number indicates a more resilient material. For latex, the ball rebound ranges from 65 to 75 percent, among the highest of natural materials.

Latex is available in many grades, covering a range of density, resiliency and hardness. Hardness is typically measured as IFD ("indentation force deflection"). Specifically, $IFD_{25}$ is the force required to compress the foam to 25% of its original thickness or height. The higher density foam grades typically have higher $IFD_{25}$ and higher ball rebound. For example, a 3.2 lb/ft$^3$ latex has an $IFD_{25}$ of 13 lb and a ball rebound of 67 percent; and a 3.5 lb/ft$^3$ latex has an $IFD_{25}$ of 15 lb and a ball rebound of 71 percent.

While latex has been popular in cushioning applications, latex also presents several major problems. First, it contains proteins that can induce allergic reactions upon contact for some people. Also, as a natural material, latex has poor flame retardancy, and thus presents a serious fire hazard. In addition, raw latex is farmed and harvested in tropical climates overseas, which requires it to be shipped over a long distance, adding substantially to the cost. Finally, the density for bedding-grade latex foam is relatively high at 3.2 lb/ft$^3$ or above, thus making a mattress made of latex foam have a significant weight. Indeed, latex foam does not lend easily to density reduction. Therefore, the cushioning and bedding industry continues to seek lower density latex replacements.

Polyurethane foams with varying density and hardness may be formed. Tensile strength, tear strength, compression set, air permeability, fatigue resistance, support factor, and cell size distribution may also be varied, as can many other properties. Specific foam characteristics depend upon the selection of the starting materials, the foaming process and conditions, and sometimes on the subsequent processing.

Cellular polyurethane structures typically are prepared by generating a gas during polymerization of a liquid reaction mixture comprised of a polyester or polyether polyol, an isocyanate, a surfactant, catalyst and one or more blowing agents. The gas causes foaming of the reaction mixture to form the cellular structure. The surfactant stabilizes the structure.

Once the foam-forming ingredients are mixed together, it is known that the foam may be formed under either elevated or reduced controlled pressure conditions. PCT Published Patent Application WO 93/09934 discloses methods for continuously producing slabs of urethane polymers under controlled pressure conditions. The foam-forming mixture of polyol, isocyanate, blowing agent and other additives is introduced continuously onto a moving conveyor in an enclosure with two sub-chambers. The foaming takes place at controlled pressure. Reaction gases are exhausted from the enclosure as necessary to maintain the desired operating pressure. The two sub-chambers, a saw, and air tight doors are operated in a manner that allows for continuous production of slabstock polyurethane foam.

U.S. Pat. No. 5,804,113 to Blackwell, et al., shows a method and apparatus for continuously producing slabstock polyurethane foam under controlled pressure conditions in which a layer of gas surrounds the reaction mixture during free rise expansion of the reaction mixture to prevent pressure fluctuations. Blackwell generally describes foam reaction mixtures that may include a variety of polyols and isocyanates, and does not express preference for any specific combinations.

U.S. Pat. No. 4,777,186 to Stang, et al., describes a method of foaming in a pressurized chamber held above atmospheric pressure (i.e., in the range of about 0.5 to 1000 psig). In addition to the gases emitted during foaming, additional gases may be introduced into the chamber to maintain the elevated pressure during foaming. The resulting foams have a higher IFD to density ratio than those previously known in the art.

Flexible polyurethane foams with high densities in the range of 35 to 70 kg/m$^3$ (or 2.2 to 4.4 lb/ft$^3$) are produced by the method disclosed in U.S. Pat. No. 5,194,453 to Jourquin, et al. Polyether polyols with molecular weights in the range of 1400 to 1800 and having primary hydroxyl group content over 50% are reacted with organic isocyanates that may be TDI, MDI or mixtures of TDI with MDI. The foams may be produced by frothing the reaction mixture, or alternatively, under vacuum conditions. Support factor was not reported, although deformation tests were conducted and the foams are indicated to have improved comfort properties.

Higher density polyurethane foams (30 kg/m$^3$ or about 1.9 lb/ft$^3$) are produced with the polyol combinations disclosed in U.S. Pat. No. 5,668,378 to Treboux, et al. The foam-forming mixture includes 80 to 99.8 percent by weight of a high functionality polyol or polyol blend with 8 to 25 percent EO, functionality from 3.2 to 6.0 and an equivalent weight of 1,000 to 4,000, a minor portion of a graft polyol, and an organic isocyanate that preferably is a mixture of TDI. The foams are foamed at atmospheric pressure.

U.S. Pat. No. 6,063,309 to Hager et al. discloses liquid-liquid polyol dispersions with an ethylene oxide (EO) content of 40 to 85 percent by weight. The polyols have a functionality greater than 2. The dispersion can be used to prepare hypersoft polyurethane foams.

High resiliency (HR) foams have been made commercially, but typically with ball rebound less than 60. For example, U.S. Pat. No. 6,372,812 to Niederoest et al. teaches the use of vacuum chamber pressure and MDI to obtain low density, high support foams. The Niederoest patent focuses on making foams with a density of 1.4 to 1.8 pounds per cubic foot. While the support factor was high, the ball rebound was 51, significantly below that of latex (generally above about 65).

Foams with lower density, but latex-like resiliency are continually sought for furniture, mattress components and pillows. The prior art does not disclose methods for making high ball rebound polyurethane foams at a low density. Nor does the prior art disclose such foams with improved flame retardancy.

SUMMARY OF THE INVENTION

According to the invention, flexible, high resiliency polyurethane foams are produced using a method comprising preparing a foam reaction mixture and foaming that mixture under vacuum conditions, preferably at pressures in the range of 0.6 to 0.95 bar (absolute), most preferably 0.8 to 0.95 bar (absolute). The reaction mixture contains (a) a polyol mixture of (i) about 85 to 95 percent by weight total polyols of a polyether polyol having a from 10 to 30 percent ethylene oxide groups, and having a hydroxyl number in the range of about 25 to 50 and a functionality from 2.5 to 3.5; and (ii) about 5 to 15 percent by weight total polyols of a graft polyol having a ratio of styrene to acrylonitrile of about 70 to 30, and having a hydroxyl number in the range of about 25 to 50 and a functionality from 2.5 to 3.0; (b) an isocyanate, preferably toluene diisocyanate or methylene diisocyanate, wherein the isocyanate index is in the range of 0 to 95; and (c) from about 1.5 to 2 parts per hundred parts polyol of water as a blowing agent.

Most preferably, the foam-forming composition contains up to 2 parts per hundred parts polyol of an amine catalyst, up to 2 parts per hundred parts polyol of a surfactant, up to 0.5 parts per hundred parts polyol of an organotin catalyst, and up to 2 to 6 parts per hundred parts polyol of a cross linking agent.

In addition, excellent results have been obtained using a polyol combination of (a) from 85 to 90 percent by weight total polyols of polyether polyol (functionality 3.1 to 3.3), having 15 to 20 percent EO groups and a hydroxyl number in the range of 28 to 32, and (b) from 10 to 15 percent by weight total polyols of a graft polyol having a ratio of styrene to acrylonitrile of about 70 to 30, and having a hydroxyl number in the range of about 25 to 30 and a functionality from 2.8 to 2.9 wherein the isocyanate index was in the range of 80 to 90. In this preferred embodiment, from about 2.1 to 2.8 parts per hundred parts polyol of water as a blowing agent; and up to 1.0 parts per hundred parts polyol of a surfactant are included in the reaction mixture.

The resulting polyurethane foams have densities in the range of about 2.0 to 3.0 pounds per cubic foot, with a ball rebound of above 65, and pass the flame retardancy test as outlined in the California Bureau of Home Furnishings Technical Bulletin 117 (CAL TB 117).

DESCRIPTION OF THE FIGURE

FIG. 1 is a schematic drawing of an apparatus that may be used to form foams under controlled pressures above atmospheric pressure.

DESCRIPTION OF THE PREFERRED EMBODIMENTS

Polyether polyols used to prepare flexible polyurethane foams typically have molecular weights between 500 and 7,000. One example of these conventional polyols is VORANOL® 3010 from Dow Chemical, which has a hydroxyl ("OH") number of 56 mg KOH/g and a functionality of 2.9, with an EO content of 8.5 percent. Often, a group of higher EO polyols is used for high resiliency (HR) foam formulations. One example is VORANOL® 4001 from Dow Chemical, which has an OH number of 31 and a functionality of 3.2, with an EO content of 15.5 percent. Another example is VORANOL® 5815, also from Dow Chemical, which has an OH number of 28 and a functionality of 3.0 with an EO content of 20 percent. Another polyol is U-2000 from Bayer AG. U-2000 has a hydroxyl number of 31 mg KOH/g and a functionality of 3.3, and an EO content of 14.3 percent.

The term "polyether polyol" includes linear and branched polyethers (having ether linkages) and containing at least two hydroxyl groups, and includes polyoxypropylene polyether polyol or mixed poly (oxyethylene/oxyprbpylene) polyether polyol. Preferred polyethers are the polyoxyalkylene polyols, particularly the linear and branched poly (oxyethylene) glycols, poly (oxypropylene) glycols and their copolymers. Graft or modified polyether polyols are those polyether polyols having a polymer of ethylenically unsaturated monomers dispersed therein. Representative modified polyether polyols include polyoxypropylene polyether polyol into which is dispersed poly (styrene acrylonitrile) or polyurea, and poly (oxyethylene/oxypropylene) polyether polyols into which is dispersed poly (styrene acrylonitrile) or polyurea. Graft or modified polyether polyols contain dispersed polymeric solids. The solids increase hardness and mechanical strength of the resultant foam. Especially preferred graft polyols used in this invention are ARCOL HS-100 from Bayer AG or Dow VORANOL 3943.

The "hydroxyl number" for a polyol is a measure of the amount of reactive hydroxyl groups available for reaction. The value is reported as the number of milligrams of potassium hydroxide equivalent to the hydroxyl groups found in one gram of the sample. "Functionality" of a polyol is defined as the average number of hydroxyl groups per molecule.

A preferred polyol combination for the invention has from 85 to 95 percent by weight HR polyether polyol and 5 to 15 percent by weight graft polyol. The preferred polyether polyol has a functionality from 2.5 to 3.5 and hydroxyl number from 25 to 50. The preferred polyether polyol should contain from 10 to 30 percent EO and greater than 75 primary OH groups. The preferred graft polyol has a functionality from 2.5 to 3.5 and hydroxyl number from 25 to 50. It should contain styrene and acrylonitrile in a ratio of about 70 to 30.

The term "polyisocyanate" refers particularly to isocyanates that have previously been suggested for use in preparing polyurethane foams. "Polyisocyanates" include di- and polyisocyanates and prepolymers of polyols and polyisocyanates having excess isocyanate groups available to react with additional polyol. The amount of isocyanate employed is frequently expressed by the term "index" which refers to the actual amount of isocyanate required for reaction with all of the active hydrogen-containing compounds present in the reaction mixture multiplied by 100. For most foam applications, the isocyanate index is in the range from 75 to 140. In this invention, the preferred isocyanate index is in the range of 80 to 95.

Conventional polyisocyanates may be used in this invention. The polyisocyanates are toluene diisocyanate (TDI), methylene diisocyanate (MDI), and a mixture of both. A well known toluene diisocyanate is TD80, a commercially available blend of 80 percent of 2, 4 toluene diisocyanate and 20 percent of 2, 6 toluene diisocyanate. A well known methylene diisocyanate is Supersec-7050 from Huntsman/ ICI, which is a prepolymer with a NCO content of 32.8 percent with over 50 percent 4, 4'-methylene diisocyanate. Polyisocyanates are typically used at a level of between 20 and 90 parts by weight per 100 parts of polyol, depending upon the polyol OH content and the water content of the formulation.

In this invention, the preferred isocyanate is TDI. If an MDI/TDI isocyanate mixture is used, the mixture may contain from 5 to 20 percent by weight TDI and 80 to 95 percent by weight MDI, with at least 50 percent by weight of the MDI component comprising 4, 4' methylene diisocyanate. Most preferably, however, when an MDI/TDI mixture is used, at least 55 percent by weight of the isocyanate component is 4, 4' methylene diisocyanate.

Catalysts are used to control the relative rates of water-isocyanate (gas-forming) and polyol-isocyanate (gelling) reactions. The catalyst may be a single component, or in most cases a mixture of two or more compounds. Preferred catalysts for polyurethane foam production are organotin salts and tertiary amines. The amine catalysts are known to have a greater effect on the water-isocyanate reaction, whereas the organotin catalysts are known to have a greater effect on the polyol-isocyanate reaction. Total catalyst levels generally vary from 0 to 5.0 parts by weight per 100 parts polyol. The amount of catalyst used depends upon the formulation employed and the type of catalyst, as known to those skilled in the art. Although various catalysts may be used in the present invention, control of the gelling catalyst level is critical to producing foams with desired air permeability, which is a factor known to significantly affect foam cushioning performance. We have found that the following ranges of catalyst amounts are satisfactory: amine catalyst from 0 to 2 parts per 100 parts polyol; and organotin catalyst from 0 to 0.5 parts per 100 parts polyol.

One or more surfactants are also employed in the foam-forming composition. The surfactants lower the bulk surface tension, promote nucleation of bubbles, stabilize the rising cellular structure and emulsify incompatible ingredients. The surfactants typically used in polyurethane foam applications are polysiloxane-polyoxyalkylene copolymers, which are generally used at levels between about 0.5 and 3 parts by weight per 100 parts polyol. In the present invention from 0 to 2 parts by weight per 100 parts polyol of surfactant is preferred, and 1 part by weight per 100 parts polyol is most preferred.

A blowing agent may be included in the foam-forming composition. The most typical blowing agent is water that may be added in amounts from 2 to 5.8 parts per hundred parts polyol. Preferably, water as blowing agent is added in an amount suitable to achieve a desired foam density, and the amount may vary depending upon the operating pressure in the foaming chamber. We have found that at pressures in the range of 0.5 to 0.95 bar (absolute), from 1.8 to 2.8, and preferably 2.1 to 2.5, parts per hundred parts polyol is an appropriate amount of water to achieve a foam with a density of about 2 to 3 pounds per cubic feet.

Cross-linking agents may be included in the foam-forming composition to enhance processing and foam stability. Typically, cross-linking agents are relatively small molecules containing 2 or 3 active hydrogen groups, and are added in amounts from 0 to 4 parts per hundred parts polyol. Representative cross-linking agents that may be included in the reaction mixture of the invention are: diethanolamine (DEOA), ethylene glycol (EG), diethylene glycol (DEG), propylene glycol (PG), dipropylene glycol (DPG), 1, 4-butanediol (BDO), commercially available Bayer AF DP1022 and R2580. Most preferably, the cross-linking agents are included in amounts from 2 to 3 parts per hundred parts polyol.

Optionally, other additives may be incorporated into the foam-forming composition. The optional additives include, but are not limited, to, fire retardants, stabilizers, antimicrobial compounds, extender oils, dyes, pigments, and antistatic agents. Such additives should not have a detrimental effect on the properties of the final polyurethane foam.

The foam-forming process may be carried out batch-wise, semi-continuously or continuously, as long as the pressure may be controlled and maintained below atmospheric pressure, preferably in the range of about 0.6 to 0.95 bar (absolute), most preferably 0.8 to 0.95 bar (absolute). The foams produced with the stated reaction mixtures at these reduced pressures have moderate densities in the range of about 2 to 3 pounds per cubic foot ($lbs/ft^3$ or pcf).

FIG. 1 shows in schematic an apparatus that might be used to practice the invention in a continuous process. The figure is taken from the disclosure in WO93/09934. In such an apparatus 10, there is a process subchamber 12 and an adjacent airlock subchamber 14. The subchambers 12, 14 are separated from one another by door 30. Foam-forming ingredients are introduced to mix head 16 and mixed for a suitable time. Once mixed together, the foam-forming ingredients form a frothing liquid that is introduced to the bottom of trough 18 and flows upwardly and onto the fall plates 22. The foam rises as it is conveyed away from the trough. After the foam is completely risen, a foam slab 25 is then cut from the foamed material using cut off blade 26. The slab is conveyed by the moving conveyor 28. Fan 24 exhausts process gases to maintain the pressure within the process enclosure 12. The first door 30 opens to allow the slab 25 into the airlock enclosure 14. The door 30 closes and the pressure inside the airlocked chamber is returned to atmospheric conditions. A second exhaust fan 32 removes additional process gases. The foam slab 25 exits the airlock chamber 14 through door 24. The airlock chamber 14 is returned to operating pressure and the process continues.

The invention is further illustrated, but not limited by, the following examples.

EXAMPLES

Foams of Examples A and B were prepared in a commercial slabstock machine such as shown in FIG. 1 using the formulations listed in Table 1.

Foams of Examples C, D and E were prepared batch-wise on a laboratory scale in a fixed head foam machine with the formulations listed in Table 1. For the laboratory-scale foams, the water, isocyanate, polyols, surfactants, catalysts and other additives were poured from the fixed mixing head into a box positioned inside a chamber in which a vacuum was drawn. The pressure was maintained below atmospheric pressure by pumping air out of the chamber. Using a pressure regulator, the pressure was maintained at the operating pressure while the foam was allowed to rise. If the foams were to be made for comparison at 1 Bar pressure, the boxes would have been located outside the chamber as pressure control would not be necessary.

IFD or "indentation force deflection" was determined in accord with a procedure similar to ASTM D 3574. In this case, for $IFD_{25}$ foam was compressed by 25 percent of its original height and the force was reported after one minute. The foam samples were cut to a size 15"×15"×4" prior to testing. Tear strength (pli), tensile strength (psi), elongation (%) also were measured according to the procedures set forth in ASTM D 3574. Air permeability was determined in cubic feet per square foot per minute for each sample using a Frazier Differential Pressure Air Permeability Pressure Machine in accord with ASTM 737.

Latex foam samples Latex 1 and Latex 2 were commercially available latex foams obtained from Latex International, a division of Latex Foam International of Ansonia, Connecticut.

TABLE 1

|  |  | Latex 1 compare | Latex 2 compare | A* | B* | C compare | D | E compare |
|---|---|---|---|---|---|---|---|---|
| Polyol | HS100 |  |  | 10 | 10 | 10 | 10 | 35 |
| Polyol | V-4001 |  |  | 90 | 90 | 0 | 90 | 65 |
| Polyol | V-3010 |  |  | 0 | 0 | 90 | 0 | 0 |
| surfactant | B-8707 |  |  | 1 | 1 | 0 | 0 | 0 |
| surfactant | B-4690 |  |  | 0 | 0 | 0 | 0.7 | 0.7 |
| surfactant | L-618 |  |  | 0 | 0 | 1 | 0 | 0 |
| Amine | ZF123 |  |  | 0.1 | 0.1 | 0.1 | 0.1 | 0.1 |
| Amine | TD33A |  |  | 0.15 | 0.15 | 0.15 | 0.15 | 0.15 |
| tin catalyst | T-9 |  |  | 0.08 | 0.08 | 0.08 | 0 | 0 |
| tin catalyst | T-12 |  |  | 0 | 0 | 0 | 0.018 | 0.018 |
| Stabilizer | DEA-LFG-85 |  |  | 1.5 | 1.5 | 1.5 | 0.7 | 0.7 |
| Blowing agent | water |  |  | 2.65 | 2.3 | 2.3 | 2.3 | 3 |
| Flame Retardant | DE 60F |  |  | 2 | 2 | 2 | 2 | 2 |
| isocyanate | TDI 80/20 |  |  | 28.4 | 26.6 | 37.6 | 4.9 | 7.5 |
| Isocyanate | MDI S-7050 |  |  | 0 | 0 | 0 | 27.6 | 42.6 |
|  | Index |  |  | 80 | 80 | 105 | 80 | 103 |
|  | Chamber Pressure (mbar) |  |  | 750 | 950 | 900 | 800 | 700 |
|  | Density (pcf) | 3.2 | 3.5 | 2.0 | 2.8 | 2.8 | 2.8 | 1.73 |
|  | IFD$_{25}$ (lb) | 13 | 15 | 8 | 15 | 44 | 17 | 26.2 |
|  | Tensile (psi) | 3.9 | 4.1 | 9.6 | 10.8 | 15.7 | 8.7 | 13.9 |
|  | Elongation (%) | 165 | 150 | 157 | 163 | 182 | 92 | 100 |
|  | Tear (pli) | 0.8 | 0.8 | 0.9 | 1.0 | 1.2 | 1.0 | 1.0 |
|  | Flammability CAL TB 117 | FAIL | FAIL | PASS | PASS | PASS | PASS | PASS |
|  | Ball Rebound (%) | 67 | 71 | 68 | 72 | 49 | 65 | 51 |

*Foams of Examples A and B were prepared in a commercial machine.

The polyols were obtained from the following suppliers: ARCOL® HS100 from Bayer AG; and VORANOL® 3010 and 4001 from Dow Chemical. The surfactants B-8707 and B-4690 were obtained from Goldschmidt. The amine catalysts ZF123, TD33A, the tin catalysts T-9, T-12 and the stabilizer DEA-LFG-85 were from Huntsman. TDI80/20 was from Dow Chemical. Flame retardant DE60F was from Great Lakes Chemicals.

Referring to the data obtained in Table 1, we found that the first sample according to the invention, Example A, had significantly a lower density than Latex 1 and Latex 2, the typical latex products for bedding and furniture applications. Example B, which was foamed at a 950 mb pressure (absolute), also had a lower density than the Latex samples. Both Examples A and B, which used the HR polyols at 87 percent, had superior ball rebound values of 68 and 72, respectively, and offered a density reduction of 37 percent and 12 percent, respectively, from the Latex samples. In comparison, Example C, which used a conventional polyol, more isocyante and a higher isocyanate index, had a low ball rebound value of 49. These samples were all made with TDI.

In Examples D (invention) and E (comparison), a mixture of MDI-TDI was used. Example D had a ball rebound of 65. This ball rebound value was slightly lower than that in Example A as a result of using a different isocyanate, but was still superior to that in Example E. Example D, compared to Example E, illustrated the combined effect of density and index on the ball rebound.

All polyurethane foam examples according to the invention passed the California flammability test (Cal TB 117), whereas the Latex samples did not.

The invention has been illustrated by detailed description and examples of the preferred embodiment. Various changes in form and detail will be within the skill of persons skilled in the art. Therefore, the invention must be measured by the claims and not by the description of the examples or the preferred embodiments.

We claim:

1. A method for producing a flexible, high resilience polyurethane foam, comprising the steps of:
   (1) preparing a reaction mixture comprising:
      (a) a polyol mixture of (i) about 85 to 95 percent by weight total polyols of a polyether polyol having from 10 to 30 percent ethylene oxide groups, and having a hydroxyl number in the range of about 25 to 50 and a functionality from 2.5 to 3.5, and (ii) about 5 to 15 percent by weight total polyols of a graft polyol having a ratio of styrene to acrylonitrile of about 70 to 30, and having a hydroxyl number in the range of about 25 to 50 and a functionality from 2.5 to 3.0;
      (b) an organic polyisocyanate selected from the group consisting of toluene diisocyanate, and methylene diisocyanate mixed with toluene diisocyanate, wherein at least 50 percent of the methylene diisocyanate is 4, 4' methylene diisocyanate, wherein if a mixture of methylene diisocyanate and toluene diisocyanate is used, the polyisocyanate mixture comprises from about 5 to 20 percent by weight toluene diisocyanate and about 80 to 95 percent by weight methylene diisocyanate, and wherein the isocyanate index is in the range of 80 to 95; and
      (c) from about 1.8 to 2.8 parts per hundred parts polyol of water as a blowing agent; and
   (2) allowing said reaction mixture to react while held at a pressure of about 0.6 to 0.95 bar (absolute) so as to form the polyurethane foam;
   wherein said polyurethane foam has a density in the range of about 2 to about 3 pounds per cubic foot.

2. The method of claim 1, wherein from about 85 to 90 percent by weight total polyols of a polyether polyol having from 10 to 20 percent ethylene oxide groups, and having a hydroxyl number in the range of about 28 to 32 and a functionality from 3.1 to 3.3 is used to prepare the reaction mixture.

3. The method of claim 1, wherein from about 5 to 10 percent by weight total polyols of a graft polyol having a ratio of styrene, to acrylonitrile of about 70 to 30 and with a hydroxyl number in the range of about 25 to 30, and having a functionality from 2.8 to 2.9 is used to prepare the reaction mixture.

4. The method of claim 1, wherein the reaction mixture contains up to three parts by weight per hundred parts polyol of a cross linking agent.

5. The method of claim 1, wherein the reaction mixture contains up to two parts by weight per hundred parts polyol of a surfactant.

6. The method of claim 1, wherein the reaction mixture contains up to two parts by weight per hundred parts polyol of a catalyst.

7. The method of claim 1, wherein the reaction mixture contains up to two parts by weight per hundred parts polyol of an amine catalyst.

8. The method of claim 1, wherein the reaction mixture contains up to 0.5 parts by weight per hundred parts polyol of a tin catalyst.

9. The method of claim 1, wherein the reaction mixture contains from about 2.1 to 2.5 parts by weight per hundred parts polyol of water as a blowing agent.

10. The method of claim 1, wherein the isocyanate index is in the range of from 80 to 95.

11. The method of claim 10, wherein the isocyanate index is in the range of from 80 to 90.

12. The method of claim 1, wherein the reaction mixture contains up to 2 parts by weight per hundred parts polyol of a flame retardant.

13. The method of claim 1, wherein the polyurethane foam has a ball rebound above about 65 percent.

14. A polyurethane foam produced according to the method of claim 1.

15. A method for producing a flexible, high resilience polyurethane foam, comprising the steps of:

(1) preparing a reaction mixture comprising
  (a) a polyol mixture of (i) about 85 to 95 percent by weight total polyols of a polyether polyol having from 10 to 30 percent ethylene oxide groups, and having a hydroxyl number in the range of about 25 to 50 and a functionality from 2.5 to 3.5, and (ii) about 5 to 15 percent by weight total polyols of a graft polyol having a ratio of styrene to acrylonitrile of about 80 to 20, and having a hydroxyl number in the range of about 25 to 50 and a functionality from 2.5 to 3.0;
  (b) an organic polyisocyanate selected from the group consisting of toluene diisocyanate, and methylene diisocyanate mixed with toluene diisocyanate, wherein at least 50 percent of the methylene diisocyanate is 4, 4' methylene diisocyanate, wherein if a mixture of methylene diisocyanate and toluene diisocyanate is used, the polyisocyanate mixture comprises from about 5 to 20 percent by weight toluene diisocyanate and about 80 to 95 percent by weight methylene diisocyanate, and wherein the isocyanate index is in the range of 80 to 95; and
  (c) from about 2.1 to 2.8 parts per hundred parts polyol of water as a blowing agent; and
(2) allowing said reaction mixture to react while held at a pressure of about 0.6 to 0.95 bar (absolute) so as to form the polyurethane foam;

wherein said polyurethane foam has a density of about 2 to about 3 pounds per cubic foot.

16. The method of claim 15, wherein the polyurethane foam has a ball rebound above about 65 percent.

17. A polyurethane foam produced according to the method of claim 15.

* * * * *